Figure 3:
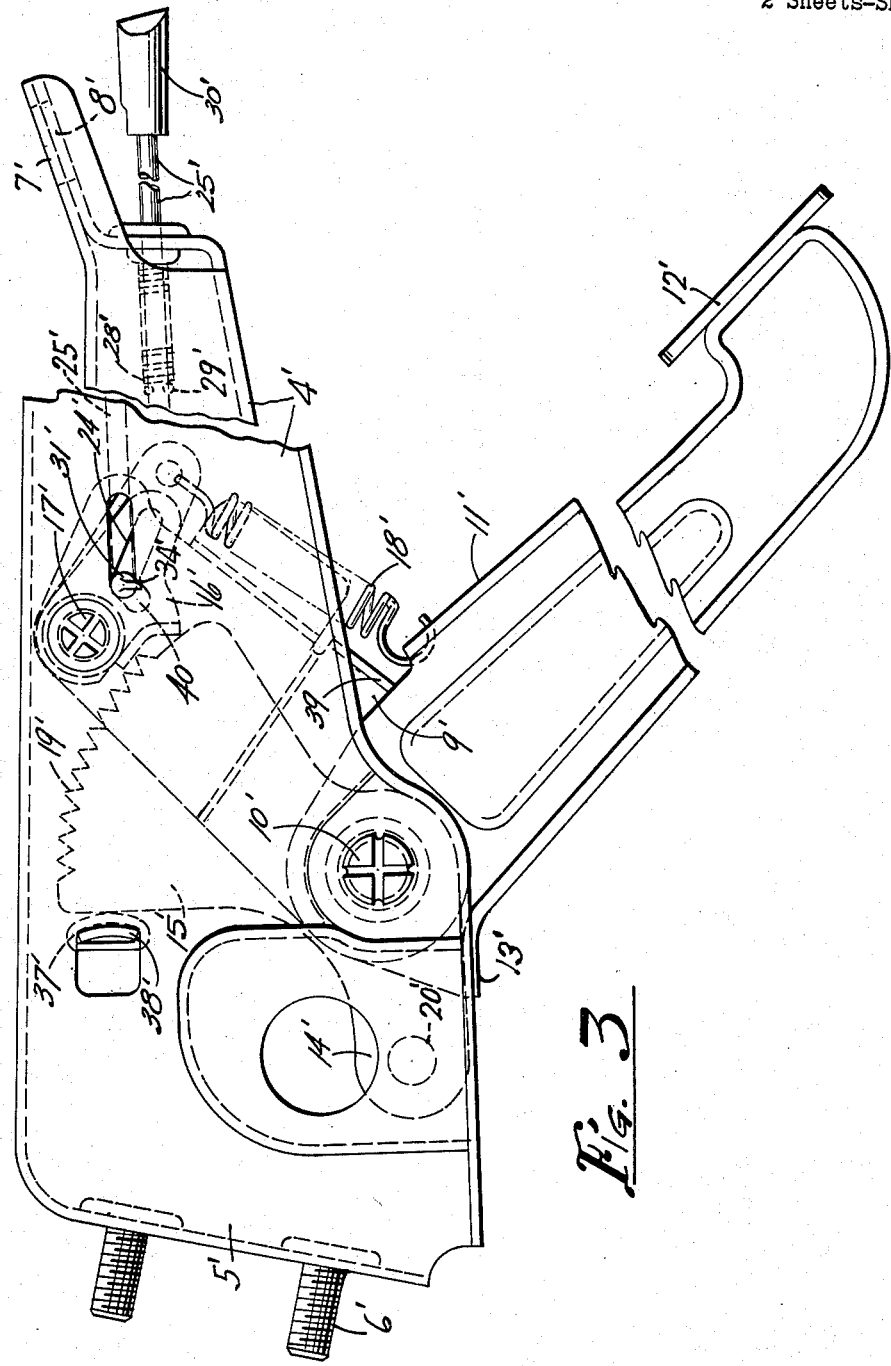

July 13, 1965  J. R. KIRK  3,194,085
FOOT-OPERATED, HAND-RELEASED PARKING BRAKE
Filed Feb. 13, 1963  2 Sheets-Sheet 1
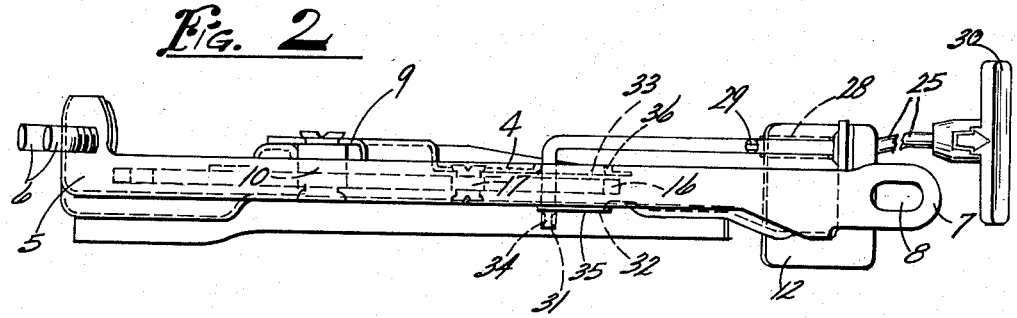
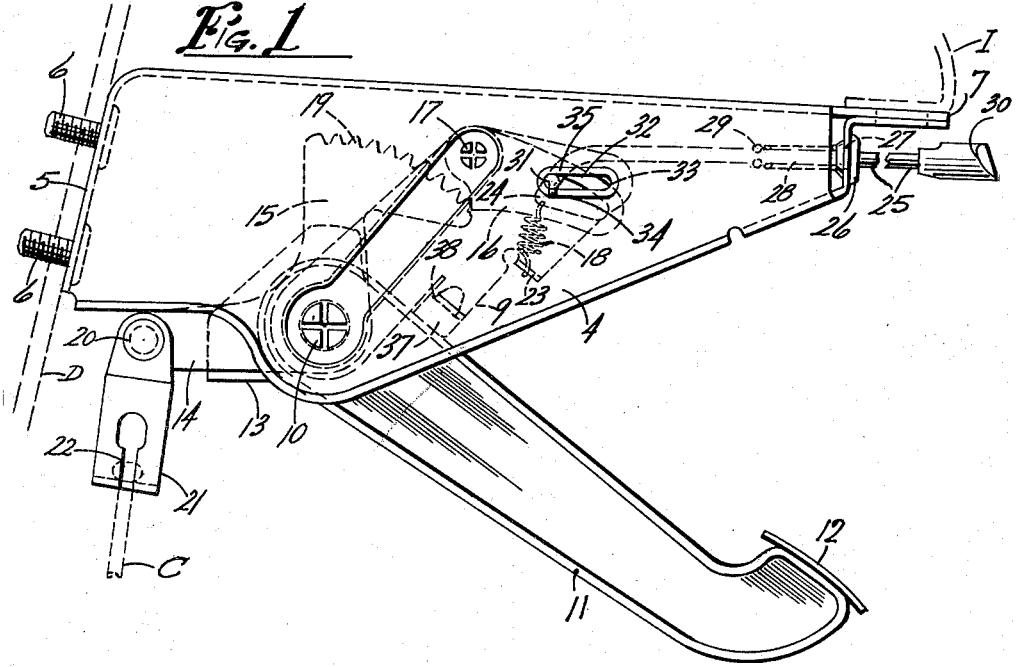
INVENTOR
JOSEPH R. KIRK
ATTORNEY July 13, 1965   J. R. KIRK   3,194,085
FOOT-OPERATED, HAND-RELEASED PARKING BRAKE
Filed Feb. 13, 1963   2 Sheets-Sheet 2

INVENTOR
JOSEPH R. KIRK
Andrew F. Wintercorn
ATTORNEY

United States Patent Office 3,194,085
Patented July 13, 1965

3,194,085
FOOT-OPERATED, HAND-RELEASED
PARKING BRAKE
Joseph R. Kirk, Rockford, Ill., assignor to Atwood Vacuum Machine Company, Rockford, Ill., a corporation of Illinois
Filed Feb. 13, 1963, Ser. No. 258,352
7 Claims. (Cl. 74—540)

This invention relates to parking brakes for motor vehicles and is more particularly concerned with one that is foot-operated and has a hand release.

Most foot-operated parking brakes have been equipped with some form of foot-operated release, which have many objections, the principal ones being awkwardness and uncertainty of operation. The driver also could not be certain that the parking brake was fully released, and, if the brake was left applied to even a small extent, the resulting decreased gasoline mileage and increased wear on the brake lining were both serious but inevitable results with that general design. With these earlier constructions there was also the necessity for a signal light or warning buzzer to indicate to the driver if the parking brake was left applied when the ignition was turned on to start the engine. Of course, that meant additional expense and introduced the possibility of the signal being out of order at some time. Therefore, it is the principal object of my invention to provide an improved hand-operated release which is simpler and more dependable, besides being easily accessible for hand release from the driver's seat, and which when pulled out gives complete assurance of full release, thereby avoiding the objections mentioned.

In the parking brake of my invention a pawl that is spring-pressed toward engagement with a segmental ratchet oscillatable with the parking brake pedal in the application of the brake to keep the brake applied is arranged to be retracted against the action of its spring by pulling out a handle on a rod mounted for reciprocation at about instrument board level, a right angle horizontal front end portion on the rod being guided in a pair of registering horizontal guide slots provided in a supporting bracket on which the pedal is mounted for oscillation, the pawl having a generally triangular cam slot provided therein through the wide front end portion of which the rod extends to cam the pawl to retracted position in the rearward movement of the rod for instant and complete release of the brake, the rod having a spring serving normally to hold the right angle end thereof in the forward end of the horizontal guide slots so that the pawl can oscillate freely with respect to it and cooperates properly with the segmental ratchet to lock the pedal in braking position.

The invention is illustrated in the accompanying drawings, in which—

FIGS. 1 and 2 are a side view and top view, respectively, of a parking brake assembly made in accordance with my invention, and FIG. 3 is a view similar to FIG. 1 showing a modified or alternative construction utilizing a single tension sping between the pawl and pedal.

Similar reference numerals are applied to corresponding parts throughout these views.

Referring first to FIGS. 1 and 2, the reference numeral 4 designates a sheet metal supporting bracket of generally triangular form that is adapted to be bolted at its forward end 5 to the dash D by means of studs 6 and also to be secured at its rear end 7 to the bottom of the instrument board I by means of a bolt entered in the slot 8. A plate 9 is riveted to the bracket 4 by means of the upset opposite ends of a pivot pin 10, and the parking brake pedal 11 is mounted between the bracket 4 and plate 9 on this pin for oscillatory movement, the pedal 11 having a pad 12 mounted on the rear end thereof providing a wide surface for the driver to apply pressure usually with his left foot when the parking brake is to be applied, thereby swinging the pedal 11 in a clockwise direction as viewed in FIG. 1, the forwardly reaching arm 13 on the pedal causing the forwardly reaching arm 14 that is provided as a part of the segmental-shaped ratchet 15 that is pivoted with the pedal 11 on pin 10 to be turned through the same angularity in a clockwise direction as the pedal 11. A pawl 16 pivoted at 17 with respect to bracket 4 is urged under tension of spring 18 toward engagement with the ratchet teeth 19 to lock the ratchet in adjusted position and keep the parking braket set, the arm 14 being pivotally connected as at 20 to a clevis 21 onto which the operated end of the parking brake cable C is attached in keyhole slot 22. The spring 18 has its one end attached to a lug 23 on the plate 9 while the other end is hooked in the wide front end of a generally triangular-shaped cam slot 24 provided in the pawl 16.

The substantially horizontal pull rod 25 is reciprocable in a bearing grommet 26 mounted in a hole 27 in the rear end of bracket 4 and has a coiled compression spring 28 caged between the front of the grommet 26 and the back of two diametrically opposed eyebrow projections 29 swedged from the rod 25, so that when the rod 25 is pulled to the rear by means of the T-shaped handle 30 provided on the rear end of the rod the spring 28 is compressed and tends to return the rod and handle to its initial position. A substantially horizontal right angle bent end portion 31 of rod 25 is guided in substantially horizontal guide slots 32 and 33 provided in registering relation in bracket 4 and plate 9 and normally is held by action of spring 28 engaged in the front end of these guide slots, the latter serving also positively to limit the rearward pull of rod 25 by engagement of the end portion 31 in the rear ends of these guide slots. The end portion 31 of rod 25 extends through the wide end of the generally triangular cam slot 24 in pawl 16 and, due to the downward inclination from a horizontal of the upper side of cam slot 24 with respect to guide slots 32 and 33 in the brake holding position of the pawl 16, the pawl is cammed upwardly to released position when the rod 25 is pulled to the rear. Hence, if the parking brake has been applied by depression of pedal 11, the brake is released immediately upon retraction of the pawl 16 by means of rod 25. Eyebrow projection 34 swedged from the extremity of the end portion 31 alongside the outwardly swedged portion 35 of bracket 4 defining slot 32 serves to prevent lateral displacement of the rod end 31 from slots 32 and 33. Plate 9 is similarly swedged outwardly as indicated at 36 in FIG. 2 to define slot 33, and these two swedged portions 35 and 36 afford broad enough bearing surfaces for sliding engagement thereon of the rod end 31 so that the operation of the rod 25 back and forth in the guide slots 32 and 33 is smooth and easy, and wear on the parts is reduced to a minimum. A rubber bumper 37 is mounted on an inclined axis on a lug 38 on plate 9 and is arranged to be struck by the back edge of the pedal 11 when the brake is released and the cable permits the pedal 11 to return to its normal position as shown in FIG. 1, thereby silencing the operation and absorbing shock.

In operation, when the parking brake is to be applied, the driver depresses the pedal 11, thereby pulling upwardly on the cable C attached at 22 on clevis 21, the segmental-shaped ratchet 15 being turned through nearly 45° in a clockwise direction in that amount of movement of pedal 11 and being locked securely by means of the spring-pressed pawl 16 so as to hold the parking brake in set condition. Under these conditions the right angle forward end portion 31 of rod 25, being accurately located with respect to the pawl by virtue of its engagement in guide slots 32 and 33 and being at the outset disposed in the wide front end portion of the triangular cam slot 24 in no way interferes with the freedom of oscillation of pawl 16 as the pawl rides over the ratchet teeth 19 to the point of its locking position, namely, where there is no further movement of pedal 11 in setting the parking brake. The instant the driver pulls rearwardly on handle 30, the straight line movement of the right angle end portion 31 of rod 25 is accurately determined by guide slots 32 and 33 on a horizontal line at an acute angle relative to the top of cam slot 24, so that the pawl 16 is released against the action of spring 18 as portion 31 of rod 25 bears against the upper side of cam slot 24 in pawl 16 thereby raising the pawl in moving from the wide end of cam slot 24 rearwardly toward the narrow end. Pedal 11 immediately upon release is swung back under pull of the parking brake cable C to its original position in abutment with bumper 37, and, of course, when the driver lets go of the handle 30, rod 25 is returned under action of spring 28 to its initial position replacing pawl 16 under control of spring 18.

Referring to FIG. 3, this construction is the same as shown in FIGS. 1 and 2 except that, in lieu of spring 18 actuating only the pawl 16, this construction has a longer and heavier coiled tension spring 18' stretched directly between the pedal 11' and pawl 16', so that this one spring serves the double purpose of urging the pawl 16' toward engagement with the teeth 19' on ratchet 15', and also to hold the pedal 11' normally in retracted position engaging lug 39 on plate 9', and accordingly return it to that position after the pedal has been depressed to apply the parking brake. In other words, there the pedal 11' is free to return to its initial position instead of being tied up with the ratchet as in the other form. The ratchet 15' in this form has its forwardly reaching arm 14' connected by means of a clevis 21 with the parking brake cable C similarly as in the first form, but, in this form, a rubber bumper in the form of a sleeve 37' is mounted on a lug 38' on plate 9' and cushions the return of the ratchet 15' to its normal position upon retraction of pawl 16' by means of pull-rod 25'. The slot 24' in pawl 16' is generally similar to the triangular slot 24 in pawl 16 but may be described as substantially L-shaped, the transverse front end portion 40, which is of approximately the same length as the wide front end of triangular slot 24, being struck on an arc with pivot 17' as a center, so that the pawl 16' is free to oscillate the same as pawl 16 so long as rod end 31' is in forward position. However, when rod 25' is pulled to the rear, the pawl 16' is retracted in the same way as pawl 16 by rod 25.

The operation of this form is the same as that of FIGS. 1 and 2 with the exceptions mentioned.

It is believed the foregoing description conveys a good understanding of the objects and advantages of my invention. The appended claims have been drawn to cover all legitimate modifications and adaptations.

I claim:

1. In combination in a foot-operated hand-released brake mechanism, a fixed elongated supporting bracket having a front end and a rear end, a brake operating pedal pivotally mounted on said bracket in parallel relationship thereto, a brake connected ratchet also movably mounted on said bracket in parallel relationship thereto and connected with said pedal to move with it in the application of the brake, a flat pawl pivotally mounted on and parallel to said bracket and engaging said ratchet to maintain the brake in applied position, spring means normally urging said pawl toward locking engagement with said ratchet, said pawl having an elongated cam slot provided therein in a lengthwise direction with respect to said bracket, said bracket having an elongated guide slot provided therein in acute angular intersecting relationship to the slot in said pawl, a manually operable rod supported for endwise reciprocation fore and aft relative to said bracket substantially parallel thereto and having a cross-portion extending through the aforesaid slots so as to be guided for straight line movement endwise of the guide slot while moving endwise also of the cam slot in said pawl to disengage said pawl from said ratchet by cam action in endwise movement of said rod, said cam slot having a widened end permitting oscillation of said pawl for locking engagement with said ratchet freely relative to the cross-portion of said rod only in one extreme position of the rod, and spring means normally urging said manually operable rod in one direction to locate its cross-portion in that end of the guide slot corresponding to the widened end of said cam slot.

2. A brake mechanism as set forth in claim 1 wherein the spring means normally urging the pawl toward locking engagement with the ratchet is also connected with the brake operating pedal tending normally to return it to a retracted position.

3. A brake mechanism as set forth in claim 1 wherein the ratchet is of segmental form and said ratchet and pedal elements are pivotally mounted together on the same axis on said bracket and connected to swing together as a unit, said mechanism including a shock absorbing bumper mounted on said bracket and arranged for engagement only by one of said ratchet and pedal elements in its retracted position.

4. In combination in a foot-operated hand-released brake mechanism, a fixed elongated supporting bracket having a front end and a rear end, a brake operating pedal pivotally mounted on said bracket in parallel relationship thereto, a brake connected ratchet also movably mounted on said bracket in parallel relationship thereto and connected with said pedal to move with it in the application of the brake, a flat pawl pivotally mounted on and parallel to said bracket and engaging said ratchet to maintain the brake in applied position, spring means normally urging said pawl toward locking engagement with said ratchet, said pawl having an elongated cam slot provided therein in a lengthwise direction with respect to said bracket, said bracket having an elongated guide slot provided therein in acute angular intersecting relationship to the slot in said pawl, and a manually operable rod supported for endwise reciprocation fore and aft relative to said bracket substantially parallel thereto and having a cross-portion extending through the aforesaid slots so as to be guided for straight line movement endwise of the guide slot while moving endwise also of the cam slot in said pawl to disengage said pawl from said ratchet by cam action in endwise movement of said rod, said cam slot having a widened end permitting oscillation of said pawl for locking engagement with said ratchet freely relative to the cross-portion of said rod only in one extreme position of the rod, said ratchet being of segmental form and said ratchet and pedal elements being pivotally mounted together on the same axis on said bracket and connected to swing together in one direction in the application of the brake, the pedal being free to pivot relative to said ratchet in the opposite direction to return to retracted position, the spring means normally urging the pawl toward locking engagement with the ratchet being also connected with said pedal to return it to retracted position.

5. A brake mechanism as set forth in claim 4 including separate bumpers on said bracket for engagement by said ratchet and pedal respectively in retracted position.

6. A brake mechanism as set forth in claim 1 including a plate fixed in spaced parallel relationship to said bracket so as to house said pawl therebetween, said plate having an elongated guide slot provided therein in full register with the guide slot in said bracket, the cross-portion of said rod being slidable at its opposite ends endwise of said guide slots while slidable intermediate its ends endwise of the cam slot in said pawl to disengage the latter from said ratchet.

7. A brake mechanism as set forth in claim 6 wherein said bracket and said plate both have flanges defined thereon lengthwise of the guide slots therein for widened bearing engagement of the cross-portion of said rod in said slots and reduction of wear on said rod and guide slots in the reciprocation of said rod.

References Cited by the Examiner

UNITED STATES PATENTS

| | | | |
|---|---|---|---|
| 1,117,278 | 11/14 | Thurber | 74—538 |
| 2,694,945 | 11/54 | Jandus | 74—540 |
| 2,899,838 | 8/39 | Johnston | 74—540 |
| 2,986,046 | 5/61 | Vigmostad | 74—540 |

FOREIGN PATENTS

| | | |
|---|---|---|
| 820,907 | 8/37 | France. |
| 104,886 | 8/99 | Germany. |

BROUGHTON G. DURHAM, *Primary Examiner.*